United States Patent
Lita et al.

(10) Patent No.: US 7,249,377 B1
(45) Date of Patent: *Jul. 24, 2007

(54) METHOD FOR CLIENT DELEGATION OF SECURITY TO A PROXY

(75) Inventors: Christian Lita, Austin, TX (US); Linas Vepstas, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/282,633

(22) Filed: Mar. 31, 1999

(51) Int. Cl.
- H04L 9/00 (2006.01)
- H04L 29/00 (2006.01)
- H04L 29/02 (2006.01)
- G06F 21/22 (2006.01)

(52) U.S. Cl. .................. 726/12; 713/156; 713/168; 713/182; 726/14; 380/255

(58) Field of Classification Search ............. 713/151
See application file for complete search history.

(56) References Cited

U.S. PATENT DOCUMENTS

| | | | | |
|---|---|---|---|---|
| 4,980,913 A | * | 12/1990 | Skret ................... | 380/23 |
| 5,241,599 A | * | 8/1993 | Bellovin et al. ........ | 380/21 |
| 5,272,754 A | * | 12/1993 | Boerbert .............. | 380/25 |
| 5,539,824 A | | 7/1996 | Bjorklund et al. | |
| 5,586,260 A | * | 12/1996 | Hu .................... | 395/200.2 |
| 5,623,601 A | * | 4/1997 | Vu .................... | 713/201 |
| 5,673,322 A | * | 9/1997 | Pepe et al. ........... | 380/49 |
| 5,732,074 A | * | 3/1998 | Spaur et al. .......... | 370/313 |
| 5,781,550 A | * | 7/1998 | Templin et al. ........ | 370/401 |

(Continued)

FOREIGN PATENT DOCUMENTS

EP    1251670 A2  * 10/2002

(Continued)

OTHER PUBLICATIONS

Gold, Steve, Italy's Omnitel Announces Unwired Planet Technology Trial, Aug. 6, 1998.*

(Continued)

*Primary Examiner*—Syed A. Zia
*Assistant Examiner*—Aravind K Moorthy
(74) *Attorney, Agent, or Firm*—Hamilton & Terrile, LLP; Stephen A. Terrile (57) ABSTRACT

A method of enabling a proxy to participate in a secure communication between a client and a server. The method begins by establishing a first secure session between the client and the proxy. Upon verifying the first secure session, the method continues by establishing a second secure session between the client and the proxy. In the second secure session, the client requests the proxy to act as a conduit to the server. Thereafter, the client and the server negotiate a session master secret. Using the first secure session, this session master secret is then provided by the client to the proxy to enable the proxy to participate in secure communications between the client and the server. After receiving the session master secret, the proxy generates cryptographic information that enables it to provide a given service (e.g., transcoding, monitoring, encryption/decryption, caching, or the like) on the client's behalf and without the server's knowledge or participation. The first secure session is maintained between the client and the proxy during such communications.

24 Claims, 4 Drawing Sheets

U.S. PATENT DOCUMENTS

| | | | |
|---|---|---|---|
| 5,889,852 A * | 3/1999 | Rosecrans et al. | |
| 5,961,593 A * | 10/1999 | Gabber et al. | 709/219 |
| 6,006,258 A * | 12/1999 | Kalajan | 709/219 |
| 6,049,821 A * | 4/2000 | Theriault et al. | 709/203 |
| 6,081,601 A * | 6/2000 | Raivisto | 380/270 |
| 6,084,969 A * | 7/2000 | Wright et al. | 380/271 |
| 6,263,437 B1 * | 7/2001 | Liao et al. | 713/169 |
| 6,308,281 B1 * | 10/2001 | Hall, Jr. et al. | 714/4 |
| 6,311,270 B1 * | 10/2001 | Challener et al. | 713/169 |
| 6,345,303 B1 * | 2/2002 | Knauerhase et al. | 709/238 |
| 6,363,478 B1 * | 3/2002 | Lambert et al. | 713/151 |
| 6,584,567 B1 * | 6/2003 | Bellwood et al. | 713/171 |
| 2005/0055434 A1 * | 3/2005 | Burrows et al. | 709/224 |
| 2005/0086342 A1 * | 4/2005 | Burt et al. | 709/224 |
| 2006/0005239 A1 * | 1/2006 | Mondri et al. | 726/13 |
| 2006/0021004 A1 * | 1/2006 | Moran et al. | 726/2 |
| 2006/0031442 A1 * | 2/2006 | Ashley et al. | 709/223 |

FOREIGN PATENT DOCUMENTS

WO     WO 2005001660 A2 *    1/2005

OTHER PUBLICATIONS

Newton's Telecom Dictionary, Feb. 2002, CMP Books, 18th Updated and Expanded Edition, p. 822.*

Microsoft Computer Dictionary, 2002, Microsoft Press, Fifth Edition, p. 428.*

IBM Technical Disclosure Bulletin, "Enhanced Export control of Cryptographic Keys Via a Control Vector", vol. 34, Apr. 11, 1992.

* cited by examiner

METHOD FOR CLIENT DELEGATION OF SECURITY TO A PROXY

BACKGROUND OF THE INVENTION

1. Technical Field

The present invention relates generally to network security protocols and, in particular, to a method of extending to an intermediary the privacy of a secure session between a client and a server.

2. Description of the Related Art

Network security protocols, such as Netscape's Secure Sockets Layer protocol (SSL) and the Internet Engineering Task Force (IETF) Transport Layer Security protocol (TLS), provide privacy and data integrity between communicating applications. These protocols, for example, are commonly used to secure electronic commerce transactions over the Internet.

Recently, the computer industry has sought to add computer processing and communications capabilities to devices other than what would normally be considered a traditional computer. Such devices are quite varied and include, for example, personal digital assistants (PDAs), business organizers (e.g., IBM® WorkPad® and the 3Com® PalmPilot®,), smartphones, cellular phones, other handheld devices, and the like. For convenience, these devices, as a class, are sometimes referred to as "pervasive computing" clients as they are devices that are designed to be connected to servers in a computer network and used for computing purposes regardless of their location.

Pervasive computing clients, however, typically do not support the full function set of an HTML Windows-based client. As a result, transcoding services typically are required to translate information to be rendered on the pervasive client from one source markup language (e.g., HTML) to another (e.g., HDML or handheld device markup language). The provision of transcoding services over a secure network connection, however, is problematic. In particular, there is a fundamental conflict between the security and transcoding services because traditional security protocols such as SSL and TLS are designed precisely to prevent a third party from intervening in the communication between the client and the server.

Restricting third party intervention in a secure session is also problematic in other applications. For example, if a client is located behind a firewall, SSL/TLS communications to servers in the outside network cannot be readily audited or otherwise monitored. Thus, data records or other sensitive information can be transmitted from the client, possibly without administrative authorization. As another example, a client that communicates with a server over a secure connection cannot take advantage of third party caching or pre-fetch mechanisms that would otherwise be useful in reducing network resource demands and enhancing communications between the devices.

It would be desirable to provide a mechanism by which a client could delegate enough security information to a proxy to enable the proxy to perform a given function (e.g., transcoding, auditing, monitoring, caching, pre-fetching, encryption/decryption on behalf of the client, etc.) without diluting the security of the network protocol.

The present invention solves this important problem.

BRIEF SUMMARY OF THE INVENTION

The present invention is a method by which a client that is using a network security protocol (e.g., SSL or TLS) to communicate with an origin server allows a proxy to participate in the session without changing the security attributes of the session. In accordance with the invention, a protocol is provided to enable the client to take a session master secret negotiated with an origin server, and to securely deliver that secret to the proxy. The proxy uses that master secret to encrypt/decrypt data passing between the client and the server.

It is thus an object of the present invention to enable a given third party intermediary or proxy to participate in a secure session between a client and a server. Preferably, the third party participates without the express knowledge of the origin server. As a consequence, the method does not require changes to the origin server, or changes to the handshake protocol used in negotiating the session secret.

It is another object of the invention to enable security and other services (e.g., transcoding, caching, monitoring, encryption/decryption on the client's behalf, and the like) to coexist while communications are passed according to a network security protocol.

It is a more specific object of the invention to enable a proxy to provide transcoding services while a pervasive computing client communicates with a server over a secure link.

It is another specific object of the invention to enable a proxy to monitor communications over a secure link originating from a client located behind a firewall.

Yet another specific object of the invention is to enable a proxy to perform caching or other administrative services on behalf of a client that communicates with a server using a network security protocol.

A still further object is to enable a proxy to perform encryption/decryption on behalf of a client that communicates with a server using a network server protocol.

According to a more specific object, the invention is a method of extending the IETF TLS version 1.0 and SSL Version 2.0/3.0 security protocols to extend the privacy of a session to an intermediary.

In a preferred embodiment, the invention describes a method of enabling a proxy to participate in a secure communication between a client and a server. The method begins by establishing a first secure session between the client and the proxy. Upon verifying the first secure session, the method continues by establishing a second secure session between the client and the proxy. In the second secure session, the client requests the proxy to act as a conduit to the server. Thereafter, the client and the server negotiate a session master secret. Using the first secure session, this session master secret is then provided by the client to the proxy to enable the proxy to participate in secure communications between the client and the server. After receiving the session master secret, the proxy generates cryptographic information that enables it to provide a given service (e.g., transcoding, monitoring, encryption/decryption, caching, or the like) on the client's behalf and without the server's knowledge or participation. The first secure session is maintained between the client and the proxy during such communications.

The foregoing has outlined some of the more pertinent objects and features of the present invention. These objects should be construed to be merely illustrative of some of the more prominent features and applications of the invention. Many other beneficial results can be obtained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION OF THE PREFERRED EMBODIMENT

Figure 1:
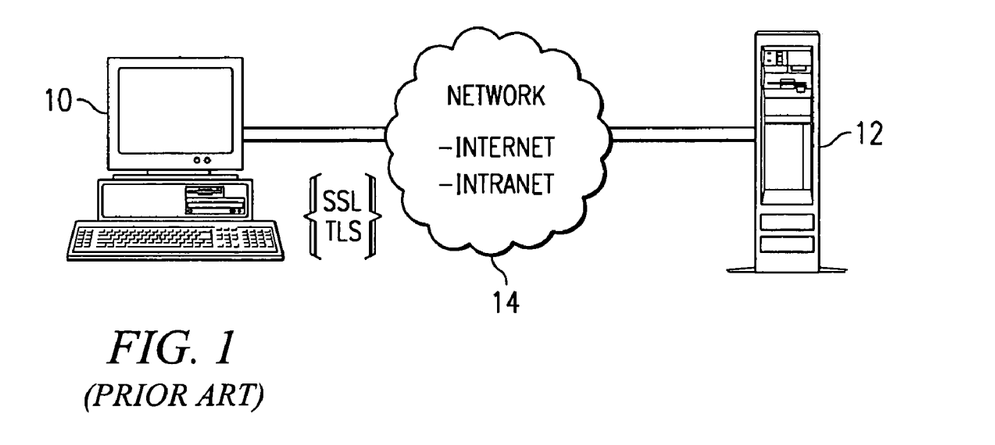
FIG. 1 is a simplified diagram of a known client-server networking environment using a network security protocol.

FIG. 1 illustrates a conventional client-server network architecture of the prior art. In this illustration, client 10 communicates to server 12 over a network 14, which may be the Internet, an intranet, a wide area network, a local area network, or the like. Client 10 and server 12 communicate using a network security protocol, such as Netscape's Secure Socket Layer (SSL) protocol or the IETF's Transport Layer Security (TLS) protocol. Generalizing, a client is any application entity that initiates a TLS or SSL connection to a server. A server is any application entity or program that accepts connections to service requests by sending back responses. Any given program may be capable of being both a client and a server. The primary operational difference between the server and the client is that the server is generally authenticated, while the client is only optionally authenticated. The server on which a given resource resides or is to be created is sometimes referred to herein as an origin server.

The client 10 and the server 12 participate in a secure session. A SSL or TLS session is an association between a client and a server that is created by a handshake protocol. Sessions define a set of cryptographic security parameters, which can be shared among multiple connections. They are used to avoid the expensive negotiation of new security parameters for each connection. In SSL or TLS, a session identifier is a value generated by a server that identifies a particular session. To establish an SSL or TLS session, the client and server perform a handshake, which is an initial negotiation that establishes the parameters of a transaction between the entities. Once a session is created, communications between the client and server occur over a connection, which is a transport (in the OSI layering model definition) that provides a suitable type of service. For SSL and TLS, such connections are peer-to-peer relationships. The connection is transient, and every connection is associated with one session. Typically, communications over the connection are secured using public key cryptography, which is a class of cryptographic techniques employing two-key ciphers. Messages encrypted with a public key can only be decrypted with an associated private key. Conversely, messages signed with the private key can be verified with the public key.

Once the session is established, the client has a certificate, which was issued by the origin server, for the purpose of authenticating the client to the origin server. The client also requires the origin server to present a certificate so that it may authenticate the origin server as valid. Authentication is the ability of one entity to determine the identify of another entity. Typically, as part of the X.509 protocol (a/k/a the ISO Authentication framework), certificates are assigned by a trusted certificate authority and provide a strong binding between a party's identity (or some other attribute) and its public key.

The above-described functionality is known in the art. The functionality is implemented, for example, in protocols confirming to IETF TLS Version 1.0 and SSL Version 2.0/3.0. These protocols, while very similar, are composed of two layers: the record protocol and the handshake protocol. As will be seen, the present invention provides a method of extending these types of security protocols to extend the privacy of a session to a third party intermediary or proxy. Preferably, the invention is implemented as a handshake protocol between a client and a proxy that is layered on top of a secure session, as will be seen. This extension does not change the basic properties of the secure connection at the record protocol layer. Although the technique is described in the context of FLS and SSL, this is not a limitation of the present invention.

Figure 2:
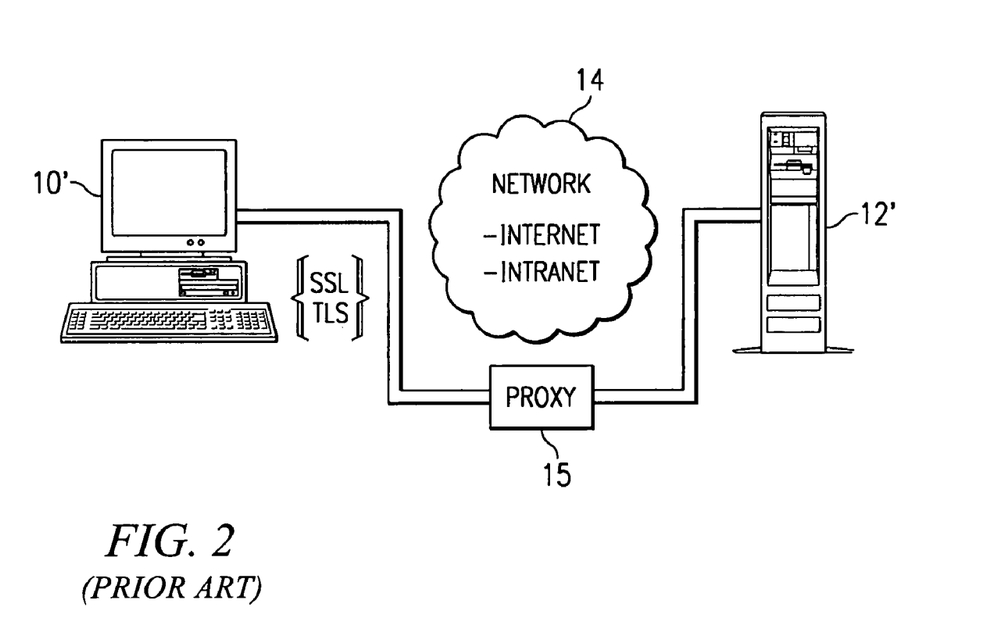
FIG. 2 is a simplified diagram of a client-server networking environment according to the present invention wherein a third party intermediary or proxy participates in a secure session.

Referring now to FIG. 2, the inventive method enables a client 10', which is using SSL or TLS as a security protocol to communicate with an origin server 12', to allow a proxy 15 to participate in the session without changing the security attributes of the session. As noted above, this method is independent of the encryption strength or the steps used by the client 10 and the origin server 12' to authenticate each other. The present invention has the same advantages of TLS/SSL in that it extends the protocol yet still allows higher level protocols to be layered on top. Such higher level protocols include, for example, application protocols (e.g., HTTP, TELNET, FTP and SMTP) that normally layer directly on top of the transport (e.g., TCP/IP) layer.

Figure 3A:
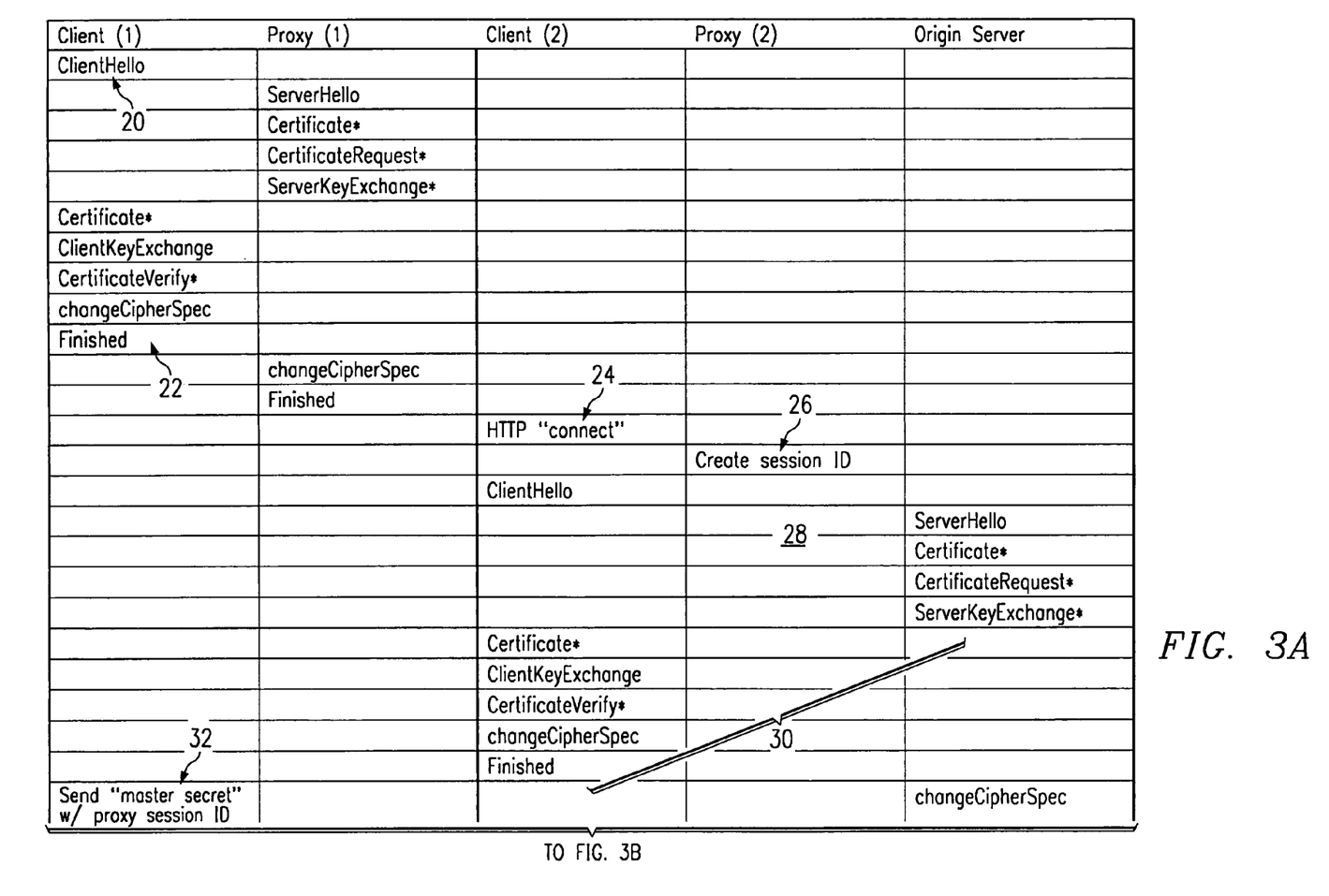
FIGS. 3A and 3B are detailed flowcharts of the inventive method.
Figure 3B:
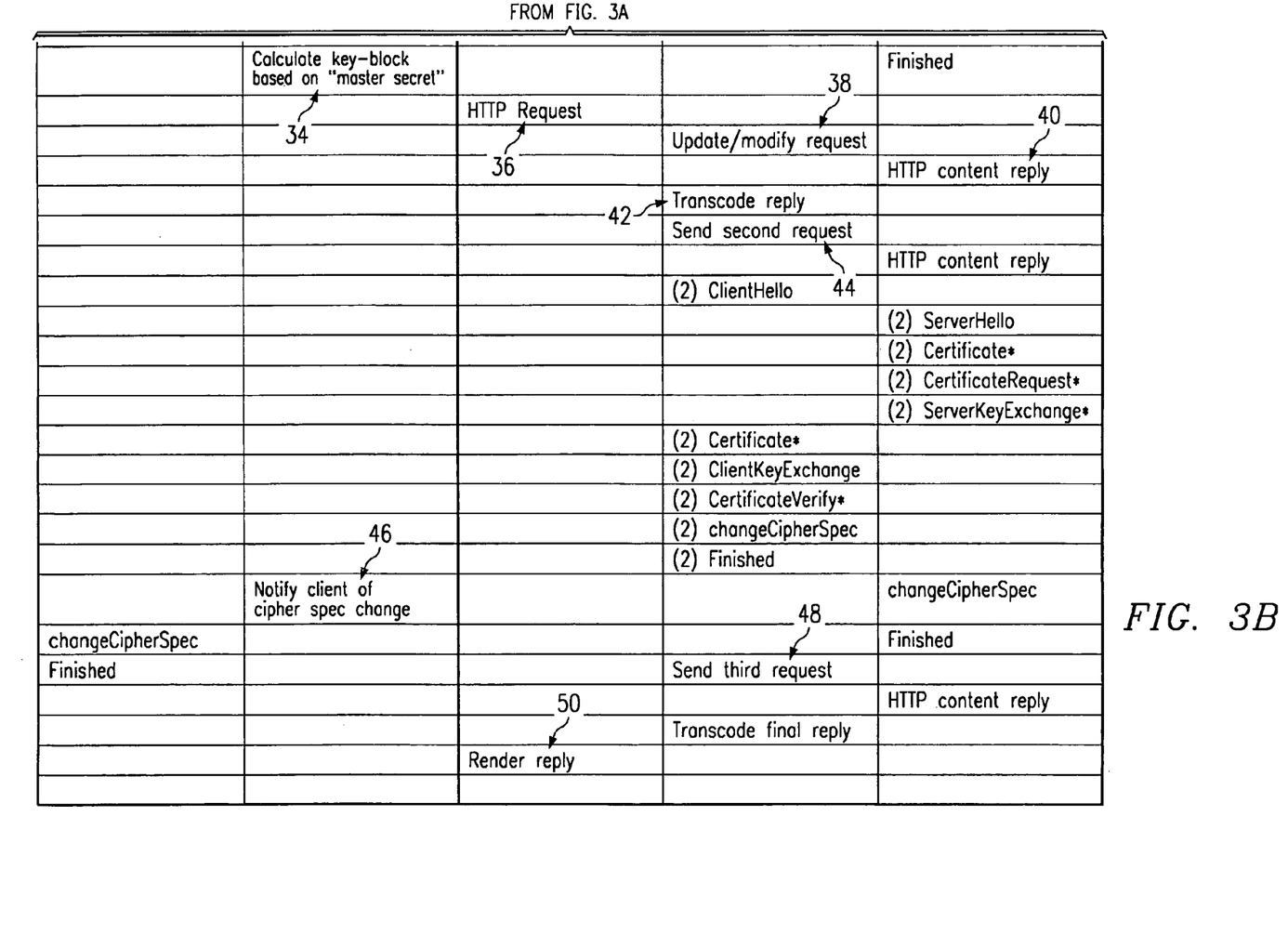

FIG. 3A and FIG. 3B are flowcharts illustrating the operation of the inventive protocol. As will be seen, the client 10' sets up two (2) distinct sessions. A first secure session is set up between the client 10' and the proxy 15, and this session is used as a pipe or conduit for passing secret information between the client and the proxy. The first secure session is represented by the first two columns of the flowchart. In addition, the client 10 also sets up a second secure session with the proxy, as represented by the last three columns of the flowchart, however, in this session the proxy 15 is used to tunnel to the origin server 12'. A tunnel is an intermediary program that acts as a blind relay between two connections. Once active, a tunnel is not considered a party to a given communication (e.g., an HTTP request or response), although the tunnel may have been initiated by that communication.

In this illustrative example, it is assumed that the client wishes to access the origin server to retrieve given content but desires to use the proxy to display those contents properly. As noted above, according to the SSL/TLS protocol, the client has a certificate issued by the origin server for the purpose of authenticating the client to the origin server, and the client also requires the origin server to present a certificate so that it may authenticate the origin server as valid. As will be seen, the client also requires the proxy to have a certificate to be authenticated by the client prior to it (the client) divulging (to the proxy) a session master secret.

The routine begins at step 20 with the client requesting a secure session with the proxy. This is the first secure session identified above. As seen in the flowchart, the client must request a certificate from the proxy since it is about to delegate its security attributes. This is the primary session through which the client will send (to the proxy) any origin server's negotiated secret, along with an internal session identifier. Typically, this identifier is not the same as the SSL/TLS session identifier. It will be described in more detail in a later step.

At step 22, the client authenticates the validity of the certificate received from the proxy and, as a result, is satisfied that it has a secure session with the proxy. The routine then continues at step 24, with the client opening a second connection to the proxy. This is the second secure session described above. As noted, the client requests to tunnel to the origin server (e.g., using the HTTP CONNECT method for a request). As part of the tunnel request through the proxy, the client adds a header to the HTTP request notifying the proxy that an internal session identifier should be generated. This header implies that the client intends to forward the master secret to the proxy at a future time.

At step 26, the proxy generates a unique internal session identifier and returns this information to the client. The value of the internal session identifier is attached to the HTTP reply. This is the value that the client will use when forwarding the session master secret to the proxy. At step 28, the proxy establishes a connection with the origin server and allows data to flow between the client and the origin server. At this point, the proxy behaves like a tunnel. It does not to an "active proxy" until the client forwards the session master secret, as will be seen. At step 30, the client performs a handshake with the origin server to negotiate a session master secret.

The routine then continues at step 32. At this point, the client sends (to the proxy) the internal session identifier along with the session master secret. This information is sent on the primary session as illustrated. At step 34, the proxy receives the internal session identifier and the session master secret. It uses this information to manufacture the necessary cryptographic information to be used to decrypt origin server replies, to modify the served content, and/or to encrypt data prior to sending it to the client. The proxy then switches to an "active proxy" for the current connection with the origin server.

At step 36, the client sends an HTTP request for a resource on the origin server. Optionally, at step 38, the proxy may decrypt the request, and modify it as needed, and then encrypt the new request and send it to the origin server. At step 40, the origin server satisfies the request and sends reply data back to the proxy. Note that the origin server preferably is not even aware of the proxy's active participation. At step 42, the proxy receives the content, decrypts, and modifies the data to satisfy the transcoding needs of the client. Optionally, at step 44, the proxy may establish additional connections with the origin server (if the origin server supports session resumption) for the purpose of obtaining additional data and/or to improve performance. If multiple connections are established, cipher block chaining (CBC) is used to adjust the cipher. If the proxy does not establish an additional connection as part of this session, it must notify the client of the cipher specification changes by sending notification on the primary session along with the session identifier. This process is illustrated at step 46 and is necessary to allow the client to resume this session with the origin server at a future time. Moreover, if the proxy requires additional secure sessions to other origin servers, e.g., to transcode the current request, it sends a notification to the client requesting the client to establish a new session with the additional origin servers. This is illustrated at step 48. Finally, the proxy encrypts the final transcoded content and sends it to the client. This is step 50.

As can be seen, the client, origin server and the proxy all share the master session secret. In particular, once the client and the origin server agree on a master session secret, that secret is provided to the proxy through a secure session previously created between the client and the proxy. Stated another way, the client hands off (to the proxy) this master session key after establishing the primary (i.e. first) session (between the client and the proxy). The origin server, however, need not be aware (and typically is not aware) that the proxy is doing some work or otherwise participating in the secure connection. In other words, the proxy does not impersonate the client.

As can be seen, the changes necessary to support this security delegation are minimal and impact only the client and proxy, not the origin server. Also, this method does not require the client to divulge any information related to its private key or the method used to authenticate the client to the origin server. Further, because the client has the ability to establish additional connections to the origin server, it may change the cipher specification or terminate the session, thus limiting the proxy's capability to establish other connections to the origin server on behalf of the client.

To summarize the changes required, the client needs to have the ability to take a session master secret negotiated with an origin server, and to securely deliver it to the proxy. The proxy needs to be able to manufacture the necessary encryption information from the client's master secret to allow it to start participating in the client's session. The above method does not require any changes to the handshake protocol used in negotiating the session secret. The additional load on the overall network traffic is minimal as there is just one additional session between the client and proxy while the client requires services from the proxy. There are no changes required to the origin server.

The primary session between the client and the proxy can be considered asynchronous, because for each arriving record there is a session identifier. Writes from the client to the proxy may occur independent of the proxy writing to the client, because there are no acknowledgments required. It is assumed, of course, that the underlying transport layer implements a reliable delivery method. Proxy requests to the client to establish new connections (to additional origin servers) preferably use a null* session identifier, because one will be assigned later by the proxy when the client requests to tunnel. For performance reasons, the proxy does not have to notify the client of cipher specification changes, with the understanding that the client will be forced to perform the full authentication handshake, because it will not be in synchronization with the origin server. This implies a larger payload on client during initial session establishment with an origin server but reduces the chatter if the proxy establishes new connections or sends additional requests to the origin server.

There are numerous applications for the proxy. The following are several representative examples.

One such use of the proxy is to reduce the necessary computing power required for a client to perform encryption/decryption. If, for example, the client is located behind a firewall, using the proxy, the client may perform the authentication steps just once but then actually send and receive data in the clear between it and the proxy, thus moving the encryption payload to the proxy. Alternatively, the proxy is used to provide auditing capabilities to a firewall configuration by enabling (or requiring) the client to hand-off the session secret before any actual data records can be exchanged with the origin server. In this case, the proxy need not require the client to deliver any private/privileged information about itself or the origin server. In still another example, the proxy may be used to improve client performance by allowing a caching proxy to participate in the session without changing the security properties of the session between the client and origin server. Alternatively, the proxy may be used to pre-fetch content on behalf of the client (by resuming sessions at a later time) without the proxy having explicit knowledge of the client's private key. In this case, the proxy could obtain, for example, regular updates of the client's subscriptions during off-peak hours. These examples are merely illustrative and should not be taken to limit the scope of this invention.

Thus, as noted above, another application of the present invention is to enable a third party to participate in a secure session involving a pervasive computing client device. Representative devices include a pervasive client that is x86-, PowerPC®- or RISC-based, that includes a realtime operating system such as WindRiver VXWorks™, QSSL QNX-Neutrino™, or Microsoft Windows CE, and that may include a Web browser. This application is now illustrated in more detail below.

Figure 4:
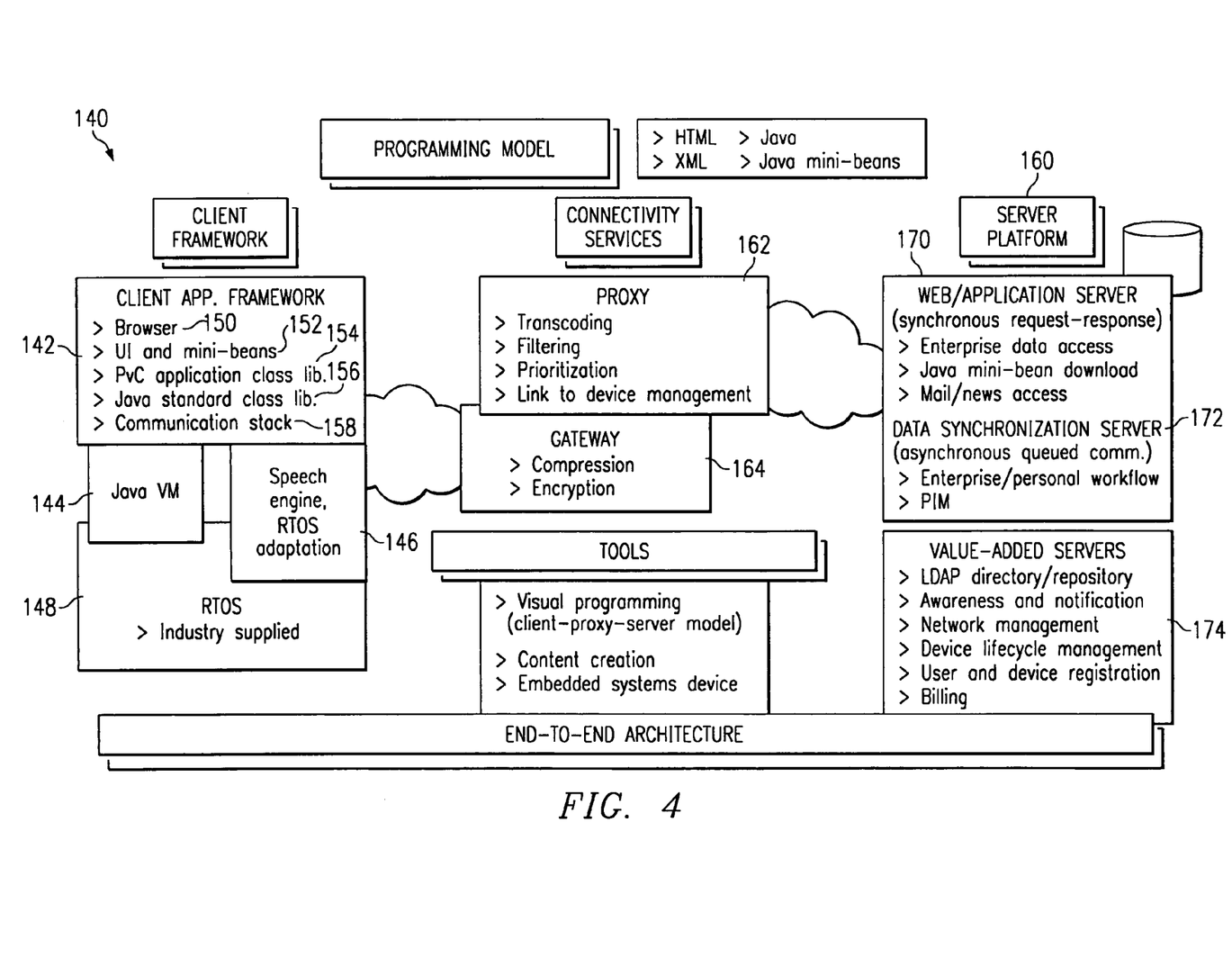
FIG. 4 is a block diagram of a pervasive computing client-server architecture in which the present invention may be implemented.

Referring now to FIG. 4, a representative pervasive computing device comprises client stack 140 including a number of components, for example, a client application framework 142, a virtual machine 144, a speech engine 146, and an industry-supplied runtime operating system (RTOS) 148. The client application framework 142 typically includes a browser 150, a user interface 152, a pervasive computing client application class library 154, a standard Java class library 156, and a communication stack 158. The pervasive computing client connects to a server platform 160 via a connectivity service 162.

At its lower level, the connectivity service 62 includes a gateway 164 that provides compression and encryption functions. The gateway implements a network security protocol that has been extended according to the method of the present invention. The upper level of the connectivity service 162 is the proxy 166 that provides one or more different functions such as: transcoding, filtering, prioritization and link to device management.

The server platform 160, namely, the origin server, may be of several different types. The platform 160 may be a Web/application server 170 (a synchronous request-response type server) or a data synchronization server 172 174 (an asynchronous queued communication type server). The basic functions are each such server type are illustrated. Alternatively, the platform 160 may be a value-added server that provides additional services such as LDAP directory/repository, awareness and notification, network management, device life cycle management, user and device registration, or billing.

The present invention provides numerous advantages over the prior art. As discussed above, the protocol extension does not change the basic properties of a secure connection at the record protocol layer. Moreover, the connection to the proxy is private, and symmetric cryptography (e.g., DES, RC4, etc.) may be used for data encryption. The keys for this symmetric encryption preferably are generated uniquely for each connection and are based on a secret negotiated by another protocol (such as TLS or SSL handshake protocol). Further, the connection to the proxy is reliable. Message transport typically includes a message integrity check using a keyed MAC. Preferably, secure hash functions (e.g., SHA, MD5, etc.) are used for MAC computations.

The inventive handshake protocol provides connection security with several basic properties. The peer's identity can be authenticated using asymmetric, i.e. public key, cryptography (e.g., RSA, DSS, etc.). This authentication can be made optional, but is generally required for at least one of the peers. Moreover, the negotiation of a shared secret is secure. The negotiated secret is unavailable to eavesdroppers, and for any authenticated connection the secret cannot be obtained, even by an attacker who can place himself in the middle of the connection. Further, the negotiation with the proxy is reliable. No attacker can modify the negotiated communication without being detected by the parties to the communication.

As further discussed above, the inventive method allows a proxy to participate in a secure session without changing the attributes of the session. The method is also independent of the encryption strength or the authentication techniques used.

The invention may be implemented in software executable in a processor, namely, as a set of instructions (program code) in a code module resident in the random access memory of the computer. Until required by the computer, the set of instructions may be stored in another computer memory, for example, in a hard disk drive, or in a removable memory, or downloaded via the Internet or other computer network.

In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

Having thus described our invention, what we claim as new and desire to secure by Letters Patent is set forth in the following claims.

The invention claimed is:

1. A method of enabling a proxy to participate in a secure communication between a client and a server, comprising the steps of:
   establishing via a connectivity service a first secure session between the client and the proxy;
   upon verifying via the connectivity service the first secure session, establishing a second secure session between the client and the proxy, the second secure session requesting the proxy to act as a conduit to the server;
   having the client and the server negotiate a session master secret;
   delivering the session master secret to the proxy using the first secure session to enable the proxy to participate in the secure communication; and
   having the proxy use the master secret and a session identifier to generate given cryptographic information.

2. The method as described in claim 1 further including the step of having the proxy modify requests and responses following receipt of the session master secret and generation of the given cryptographic information.

3. The method as described in claim 2 wherein the proxy performs a given service on behalf of the client while modifying content from the server.

4. The method as described in claim 3 wherein the given service is selected from a set of services including transcoding, caching, encryption, decryption, monitoring, filtering and pre-fetching.

5. The method as described in claim 1 wherein the first and second secure sessions confirm to a network security protocol.

6. The method as described in claim 5 wherein the network security protocol is SSL.

7. The method as described in claim 5 wherein the network security protocol is TSL.

8. The method as described in claim 1 wherein the server is a Web server and the client is a pervasive computing client.

9. A method of enabling a proxy to participate in a secure communication between a client and a server, comprising the steps of:
- having the client request a first secure connection to the proxy;
- upon authenticating validity of a certificate received from the proxy, having the client request a second secure connection to proxy, the second secure connection requesting the proxy to act as a conduit to the server;
- having the proxy generate a session identifier;
- having the client and the server negotiate a session master secret through the conduit;
- upon completion of the negotiation, having the client deliver the session master secret to the proxy using the first secure connection;
- having the proxy use the session master secret and the session identifier to generate given cryptographic information that is useful for participating in the secure communication.

10. The method as described in claim 9 further including the step of having the proxy modify requests and responses following receipt of the session master secret and generating of the given cryptographic information.

11. The method as described in claim 10 wherein the proxy performs a given service on behalf of the client while modifying content from the server.

12. The method as described in claim 11 wherein the given service is selected from a set of services including transcoding, caching, encryption, decryption, monitoring, filtering and pre-fetching.

13. The method as described in claim 9 wherein the first and second secure sessions confirm to a network security protocol.

14. The method as described in claim 13 wherein the network security protocol is SSL.

15. The method as described in claim 13 wherein the network security protocol is TSL.

16. A method for establishing the security of a session between a client and a server, comprising the steps of:
- through a proxy, conducing a security handshake procedure between the client and the server to produce a session key; and
- transmitting the session key to the proxy so that the proxy can participate in communications between the client and the server during the session.

17. The method as described in claim 16 wherein the session key is transmitted from the client to the proxy over a secure connection.

18. The method as described in claim 17 wherein the secure connection between the client and the proxy is created before the security handshake procedure is maintained throughout the session.

19. A cryptographic system, comprising:
- a client;
- a server;
- a proxy;
- a network protocol service for enabling the client and server to communicate over a secure connection;
- a computer program product in a computer readable medium (i) for controlling the client to request a first secure connection to the proxy, (ii) responsive to authenticating validity of a certificate from the proxy, for controlling the client to request a second secure connection to proxy, the second secure connection requesting the proxy to act as a conduit to the server, (iii) for controlling the client to negotiate with the server through the conduit to obtain a session master secret; and (iv) upon successful completion of the negotiation, for controlling the client to deliver the session master secret to the proxy using the first secure connection; and
- a computer program product in a computer readable medium (i) for controlling the proxy to use the session master secret and a session identifier to generate given cryptographic information, and (ii) for having the proxy modify content in communications between the client and the server.

20. The cryptographic system as described in claim 19 wherein the proxy includes means for providing transcoding services on behalf of the client.

21. The cryptographic system as described in claim 19 wherein the proxy includes means for providing encryption/decryption services on behalf of the client.

22. The cryptographic system as described in claim 19 wherein the proxy includes means for providing caching services on behalf of the client.

23. The cryptographic system as described in claim 19 wherein the proxy includes means for providing monitoring services on behalf of the client.

24. A computer program product in a computer readable medium for use in a cryptographic system including a client, a server, and a proxy, comprising:
- a first routine (i) for controlling the client to request a first secure connection to the proxy, (ii) responsive to authenticating validity of a certificate from the proxy, for controlling the client to request a second secure connection to proxy, the second secure connection requesting the proxy to act as a conduit to the server, (iii) for controlling the client to negotiate with the server through the conduit to obtain a session master; and (iv) upon successful completion of the negotiation, for controlling the client to deliver the session master secret to the proxy using the first secure connection; and
- a second routine (i) for controlling the proxy to use the session master secret and a session identifier to generate given cryptographic information, and (ii) for having the proxy modify content in communications between the client and the server.

* * * * *